United States Patent [19]

Bowles et al.

[11] Patent Number: 5,549,831
[45] Date of Patent: Aug. 27, 1996

[54] METHOD FOR PROCESSING CHEMICAL CLEANING SOLVENT WASTE

[75] Inventors: Cary R. Bowles, Lynchburg; Sidney D. Jones, Forest; Gary A. Peters, Forest, all of Va.

[73] Assignee: B&W Nuclear Technologies, Inc., Lynchburg, Va.

[21] Appl. No.: 512,619

[22] Filed: Aug. 8, 1995

[51] Int. Cl.$^6$ .................................................. B01D 61/00
[52] U.S. Cl. ..................... 210/650; 210/652; 210/641; 210/770; 210/774; 210/908; 95/149; 95/158; 208/424; 208/81
[58] Field of Search ................................ 210/650, 651, 210/652, 770, 774, 180, 181, 175, 908, 641, 763, 641; 95/149, 158, 641; 55/268, 466; 208/424, 81, 105

[56] References Cited

U.S. PATENT DOCUMENTS

| | | | |
|---|---|---|---|
| 3,174,262 | 3/1965 | Lutz | 95/158 |
| 4,060,591 | 11/1977 | Garber et al. | 95/158 |
| 4,162,902 | 7/1979 | Wiesmer et al. | 95/158 |
| 4,544,477 | 10/1985 | Taylor | 208/11 R |
| 5,160,636 | 11/1992 | Gilles et al. | 210/763 |

*Primary Examiner*—Ana Fortuna
*Attorney, Agent, or Firm*—Robert J. Edwards; D. Neil LaHaye

[57] ABSTRACT

A method for processing chemical cleaning solvent waste that combines evaporation, purification, and detoxification. The method is mobile and thus allows the processing to be done at the site of the cleaning where the entire processing can be completed. Evaporation produces a concentrated solvent and vapor and gas. The concentrated solvent is detoxified to produce a dry residue for long term storage or disposal and a liquid that is filtered and then released to the surrounding environment. The vapor and gas are scrubbed and condensed to produce a gas that is suitable for release and a distillate. The distillate is purified by filtration and reverse osmosis to produce a distillate that is suitable for release.

5 Claims, 1 Drawing Sheet

METHOD FOR PROCESSING CHEMICAL CLEANING SOLVENT WASTE

BACKGROUND OF THE INVENTION

1. Field of the Invention

The invention is generally related to the waste processing of chemical cleaning solvents and more particularly to a method for processing chemical cleaning solvent waste.

2. General Background

In many industries, the life and performance of equipment can be compromised by the accumulation of corrosion products. This is especially true for steam generators used by electrical utilities. The corrosion products appear as sludge on the tubesheet and block flow holes in tube support plates. Fouling consists of solid deposits, primarily iron, at the tube support plates and on the outside of tubes. Support plate deposits can increase pressure drop resulting in reduced steam generator performance. Tube bundle deposits can reduce heat transfer capability, also degrading performance. Buildup of these deposits can concentrate contaminants such as chlorides and fluorides which promote stress corrosion cracking. Mechanical cleaning methods such as water lancing can remove deposits from accessible areas. However, chemical cleaning is the only means to completely remove deposits in a pressurized water reactor (PWR) steam generator. A chemical solution is introduced into the secondary side during a shutdown. Then, following a soaking period, the unit is flushed. Sludge piles are removed by water lancing. Chemical cleaning of nuclear steam generators generates a large volume of solvent waste, generally seventy-five thousand to two hundred fifty thousand gallons. It then is necessary to process the chemical cleaning solvent waste to reduce to a minimum the volume of material or liquid that must be stored or disposed of so as not to release hazardous material into the surrounding environment. Technologies previously used for such processing include the following: evaporation to concentrate the solvent, solidification of the concentrate, and chemical treatment of the distillate; wet oxidation of the solvent, reverse osmosis, and chemical treatment to purify the distillate; dilution of the solvent, chemical treatment to precipitate the metals, and use of filtration and/or filter press to separate the metals; wet-air oxidation of the solvent, and solidification of the concentrate; and ion exchange of the solvents.

SUMMARY OF THE INVENTION

The invention addresses the needs of processing chemical cleaning solvent waste. What is provided is a method for processing chemical cleaning solvent waste that combines evaporation, purification, and detoxification. The method is mobile and thus allows the processing to be done at the site of the cleaning where the entire processing can be completed. Evaporation produces a concentrated solvent and vapor and gas. The concentrated solvent is detoxified to produce a dry residue for long term storage or disposal and a liquid that is filtered and then released to the surrounding environment. The vapor and gas are scrubbed and condensed to produce a gas that is suitable for release and a distillate. The distillate is purified by filtration and reverse osmosis to produce a distillate that is suitable for release.

BRIEF DESCRIPTION OF THE DRAWINGS

For a further understanding of the nature and objects of the present invention reference should be had to the following description, taken in conjunction with the accompanying drawings in which like parts are given like reference numerals, and wherein.

DETAILED DESCRIPTION OF THE PREFERRED EMBODIMENT

Figure 1:
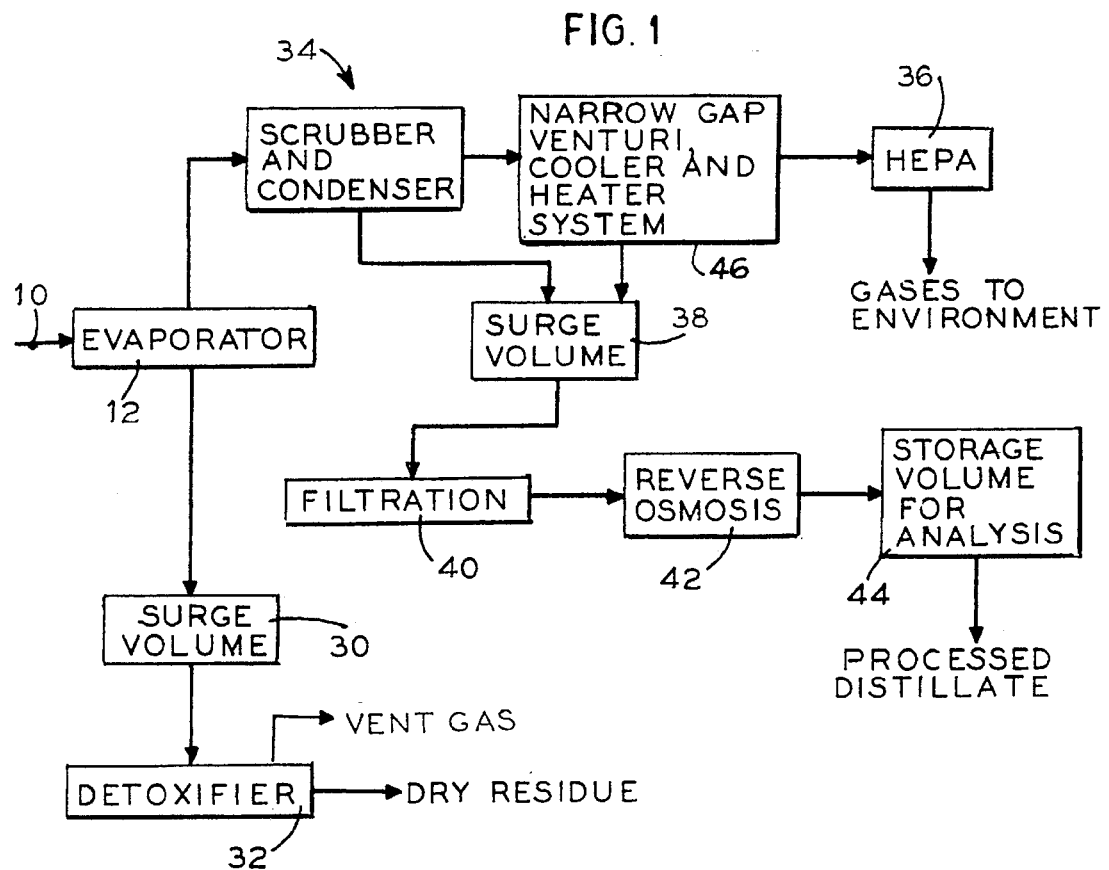
FIG. 1 is a schematic illustration of the method of the invention.

Referring to the drawings, it is seen that the method of the invention is illustrated in the schematic of FIG. 1. The invention combines the use of evaporation, detoxification, and filtration to process cleaning solvent waste.

The first step is to direct the solvent waste stream 10 to an evaporator 12 for separating the solvent waste stream into gaseous products and a lower volume concentrated liquid.

Figure 2:
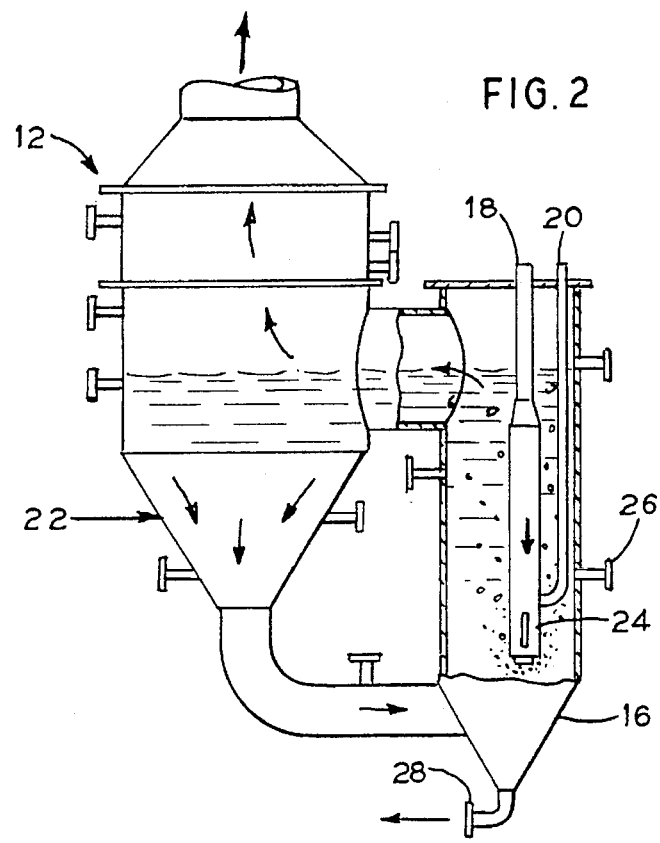
FIG. 2 is a sectional view of a submerged combustion evaporator used in the method of the invention.

In the preferred embodiment, a submerged combustion evaporator 12 such as that illustrated in FIG. 2 is used. Submerged combustion evaporator 12 is formed from a combustion vessel 16, burner 18, igniter 20, and vapor disengagement vessel 22. Combustion vessel 16 has fluid communication at its upper and lower end with vapor disengagement vessel 22. Burner 18 is positioned in combustion vessel 16 such that combustion chamber 24 of burner 18 is submerged in the waste liquid being processed. A mixture of air and propane are forced into burner 18. Igniter 20, which is in communication with combustion chamber 24, provides an ignition source to cause combustion of the air and propane mixture in the liquid. The 3.0M BTU/hour generated leaves the burner as sensible heat in the combustion gases. The hot gases are released in a tremendous number of bubbles that create the maximum surface area for heat transfer. Since these gases are directly in contact with the solution, the heat is transferred immediately to the liquid. The condensible combustion gases are cooled and leave the solution at the temperature of the liquid, intimately mixed with water vapor. Since submerged combustion evaporator 12 does not have heat transfer surfaces that could become fouled during operation, it requires only minimal maintenance. Bubbling combustion gases through the liquid results in a boiling point depression. Therefore, under submerged combustion conditions, the solvent boils at a temperature appreciably below its atmospheric boiling point. As an example, when burning propane with five percent excess air, the boiling point of water is approximately one hundred ninety-two degrees fahrenheit. As the amount of excess air is increased, the boiling point decreases accordingly. As seen in FIG. 2, the liquid circulates between combustion chamber 16 and vapor disengagement vessel 22 while the combustion gases saturated with water vapor exit through the top of vessel 22. The liquid concentrate and gases are processed separately.

The solvent waste stream is directed into combustion chamber 16 through inlet 26. The waste liquid feed line preferably includes a magnetic flow meter with a flow totalizer, not shown, that is used to meter and control the feed to evaporator 12. A flow control valve, not shown, is set by the operator at an equilibrium flow rate of approximately four gallons per minute. When the liquid concentrate in combustion chamber 16 reaches the desired concentration (determined by specific gravity measurement), outlet valve 28 is opened to allow pumping of the concentrate to a detoxifier which will be discussed below. The operator controls the liquid level in evaporator 12 by adjusting the feed to and/or discharge from evaporator 12. At equilibrium, the rate of evaporator concentrate removal plus the rate of distillate production is equal to the rate of feed. This first step achieves an initial volume reduction of seventy-five to ninety-nine percent. Treatment of the gases is separate from that of the liquid concentrate and will be discussed further below.

The second step in the process involves separate processing of the liquid concentrate and the gases. Processing of the liquid concentrate will be discussed first.

As seen in the schematic of FIG. 1, the liquid concentrate is delivered to a surge volume tank 30 and then from the surge volume tank 30 to a detoxifier 32. It is necessary to use the surge volume tank 30 between the evaporator 12 and the detoxifier 32 because different processing flow rates may be encountered depending on the rate of waste feed. In the first step in the detoxifier 32, a heated screw evaporator is used to cause vaporization of the continuously fed liquid organics. The dry flaky particle residue produced is collected in a drum which is periodically changed out. In the second step in the detoxifier 32, all the organics that were vaporized (i.e., EDTA, EDA, hydrazine, etc.) are converted by high temperature in a detoxification reactor to non-toxic synthetic vent gas (syngas). The drum containing the dry flaky particle residue is removed from the drum feeder. This dry residue will consist of elemental metals or associated metal oxides removed from the steam generators. Testing conducted indicates that this residue will pass the TCLP (toxicity characteristics leaching procedure) test.

The final major processing step is the purification of the distillate from the evaporator 12 to insure that the distillate can be discharged. The exhaust gases from the evaporator 12 are drawn into a scrubber and condenser 34. The gas stream is scrubbed with a narrow gap venturi scrubber, cooler, and heater system 46 to remove particulates. The gases are then cooled in system 46 to remove any excess moisture and then reheated in system 46 in order to vaporize any residual moisture and minimize fouling of the HEPA (high efficiency particulate air) filters 36. The gases are discharged to the atmosphere after being passed through the HEPA filters 36.

The distillate from the scrubber and condenser 34 is directed to a surge volume tank 38 and then to a filtration system 40. The surge volume tank 38 is used to allow for different processing rates between scrubber and condenser 34 and filtration system 40. Filtration system 40 is preferably a membrane ultrafiltration apparatus and is capable of meeting all the required discharge criteria. A reverse osmosis apparatus 42 is used to further cleanse the condensate. Reverse osmosis apparatus 42 may included a single pass or a double pass reverse osmosis apparatus. A storage volume tank 44 is maintained for analysis of the processed distillate to insure that the site specific discharge criteria are met. The processed distillate may be released to the surrounding environment. It is estimated that a minimum volume reduction factor of ninety percent is achievable using the proposed treatment. The remaining ten percent concentrate will either be fed back to the evaporator 12 or to the detoxifier 32 for further processing.

Use of the method of the invention on the liquid produced during a typical nuclear steam generator chemical cleaning will produce residue that will fit in nine fifty-five gallon drums. This is based on the theoretical volume of all the metals removed from the steam generators being in the oxide form (except copper). This theoretical volume is twenty-one and six-tenths cubic feet, or three fifty-five gallon drums. This theoretical volume is then multiplied by a factor of three to account for void space in the flaky residue.

The method of the invention provides the following advantages. The liquid waste is converted to a final waste form of dry residue that is suitable for long term storage and disposal and is non-hazardous. A very high volume reduction is achieved since only the metal residue portion of the solvents remain. Typically less than one percent of the original volume remains for final storage or disposal while the remaining ninety-nine percent of the volume is discharged in a gaseous or liquid form that meets site discharge limits. All processing is done at the site of generation and thus does not require shipping of any waste outside of the site facilities. This saves money and eliminates potential liabilities associated with shipping hazardous materials. No volume increase occurs anytime during the use of the inventive method. During the processing, the waste volume is continually decreased. The method provides flexibility to insure that discharge limits are met. Distillate from the scrubber and condenser 34 and the concentrate from the reverse osmosis process can be re-evaporated in the evaporator.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A method for processing chemical cleaning solvent waste which contains metals and metal oxides and organics, comprising:

a. separating by evaporating the solvent waste stream into gaseous products and a lower volume concentrated liquid and collecting said gaseous products and said concentrated liquid for further treatment;

b. vaporizing said concentrated liquid to separate the metals and metal oxides from the organics contained therein to produce separate products of a dry flaky particle residue and an organic gaseous product and collecting the residue for storage and the gaseous product for further treatment;

c. treating said organic gaseous product produced in step b. above at high temperature to convert it to non-toxic synthetic vent gas;

d. scrubbing said gaseous products produced in step a. above to remove particulates contained therein;

e. cooling the scrubbed gaseous products to remove excess moisture and collecting the excess moisture for further treatment;

f. reheating the cooled gaseous products to remove any residual moisture and collecting the residual moisture with the excess moisture collected in step e.;

g. directing the reheated gaseous products through HEPA filters for discharge to the surrounding environment; and h. treating the moisture collected in steps e. and f. by filtration and reverse osmosis whereby the treated liquid may be released to the surrounding environment.

2. The method of claim 1, wherein said first step of separating the solvent waste stream uses a submerged combustion evaporator.

3. The method of claim 1, wherein the filtration in step f. uses a membrane ultrafiltration apparatus.

4. The method of claim 1, wherein the reverse osmosis in step f. uses a double pass reverse osmosis apparatus.

5. The method of claim 1, wherein the reverse osmosis in step f. uses a single pass reverse osmosis apparatus.

* * * * *